United States Patent
Li et al.

(10) Patent No.: US 11,195,147 B2
(45) Date of Patent: Dec. 7, 2021

(54) MOBILE TERMINAL AND METHOD FOR CHECKING FIXED ASSETS

(71) Applicant: HONGFUJIN PRECISION ELECTRONICS(TIANJIN)CO., LTD., Tianjin (CN)

(72) Inventors: Yan-Bin Li, Shenzhen (CN); Chi-Hung Hou, Taoyuan (TW); Yin-Ping Feng, Tianjin (CN); Shu-Tao Wang, Tianjin (CN); Si-Qi Sun, Tianjin (CN); Mei Li, Tianjin (CN); Peng Wang, Tianjin (CN)

(73) Assignee: HONGFUJIN PRECISION ELECTRONICS(TIANJIN)CO., LTD., Tianjin (CN)

( * ) Notice: Subject to any disclaimer, the term of this patent is extended or adjusted under 35 U.S.C. 154(b) by 196 days.

(21) Appl. No.: 16/716,839

(22) Filed: Dec. 17, 2019

(65) Prior Publication Data
US 2021/0110335 A1 Apr. 15, 2021

(30) Foreign Application Priority Data
Oct. 11, 2019 (CN) .......................... 201910962679.5

(51) Int. Cl.
| | |
|---|---|
| *G06Q 10/08* | (2012.01) |
| *G06K 7/14* | (2006.01) |
| *G06K 7/10* | (2006.01) |

(52) U.S. Cl.
CPC ....... *G06Q 10/087* (2013.01); *G06K 7/10297* (2013.01); *G06K 7/1417* (2013.01)

(58) Field of Classification Search
None
See application file for complete search history.

(56) References Cited

U.S. PATENT DOCUMENTS

2017/0276573 A1* 9/2017 Radkiewicz .......... G06Q 10/20

FOREIGN PATENT DOCUMENTS

| CN | 209086990 U | 7/2019 |
|---|---|---|
| TW | 201709119 A | 3/2017 |

OTHER PUBLICATIONS

NPL—Collaborative tracking, Zhiheng Zhao and others, Elsevier Ltd. Advanced Engineering Informatics 43 (2020), downloaded from https://doi.org/10.1016/j.aei.2020.101044 on Aug. 26, 2021, pp. 1-12. (Year: 2019).*

* cited by examiner

*Primary Examiner* — Paul Danneman
(74) *Attorney, Agent, or Firm* — ScienBiziP, P.C.

(57) ABSTRACT

A method for checking fixed assets of an enterprise which may be in various locations include receiving a checking task sent by the server, and obtaining fixed assets information by reading an identification tag of a plurality of fixed assets by a tag reading device of one or more mobile terminals. The method further can include obtaining an result of checking the fixed assets by checking the plurality of fixed assets according to the fixed assets information and the checking task, determining whether the result of checking the fixed assets is normal, and sending the result of checking the fixed assets to the server when the result of checking the fixed assets is normal.

22 Claims, 6 Drawing Sheets

MOBILE TERMINAL AND METHOD FOR CHECKING FIXED ASSETS

CROSS-REFERENCE TO RELATED APPLICATIONS

This application claims priority to Chinese Patent Application No. 201910962679.5 filed on Oct. 11, 2019, the contents of which are incorporated by reference herein.

FIELD

The subject matter herein generally relates to checking of assets.

BACKGROUND

An operating environment can be complex and need many departments of an enterprise which may own or be responsible for a great deal of property. Checking fixed assets of an enterprise may be a chore and inconvenient. A checking process needs to be manually operated or carried out in stages, this is inefficient and an error rate is high.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

In order to provide a clear understanding of the objects, features, and advantages of the present disclosure, the same are given with reference to the drawings and specific embodiments. It should be noted that non-conflicting embodiments in the present disclosure and the features in the embodiments may be combined with each other without conflict.

In the following description, numerous specific details are set forth in order to provide a full understanding of the present disclosure. The present disclosure may be practiced otherwise than as described herein. The following specific embodiments are not to limit the scope of the present disclosure.

Unless defined otherwise, all technical and scientific terms herein have the same meaning as used in the field of the art as generally understood. The terms used in the present disclosure are for the purposes of describing particular embodiments and are not intended to limit the present disclosure.

The present disclosure, referencing the accompanying drawings, is illustrated by way of examples and not by way of limitation. It should be noted that references to "an" or "one" embodiment in this disclosure are not necessarily to the same embodiment, and such references mean "at least one."

Furthermore, the term "module", as used herein, refers to logic embodied in hardware or firmware, or to a collection of software instructions, written in a programming language, such as Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives.

Figure 1:
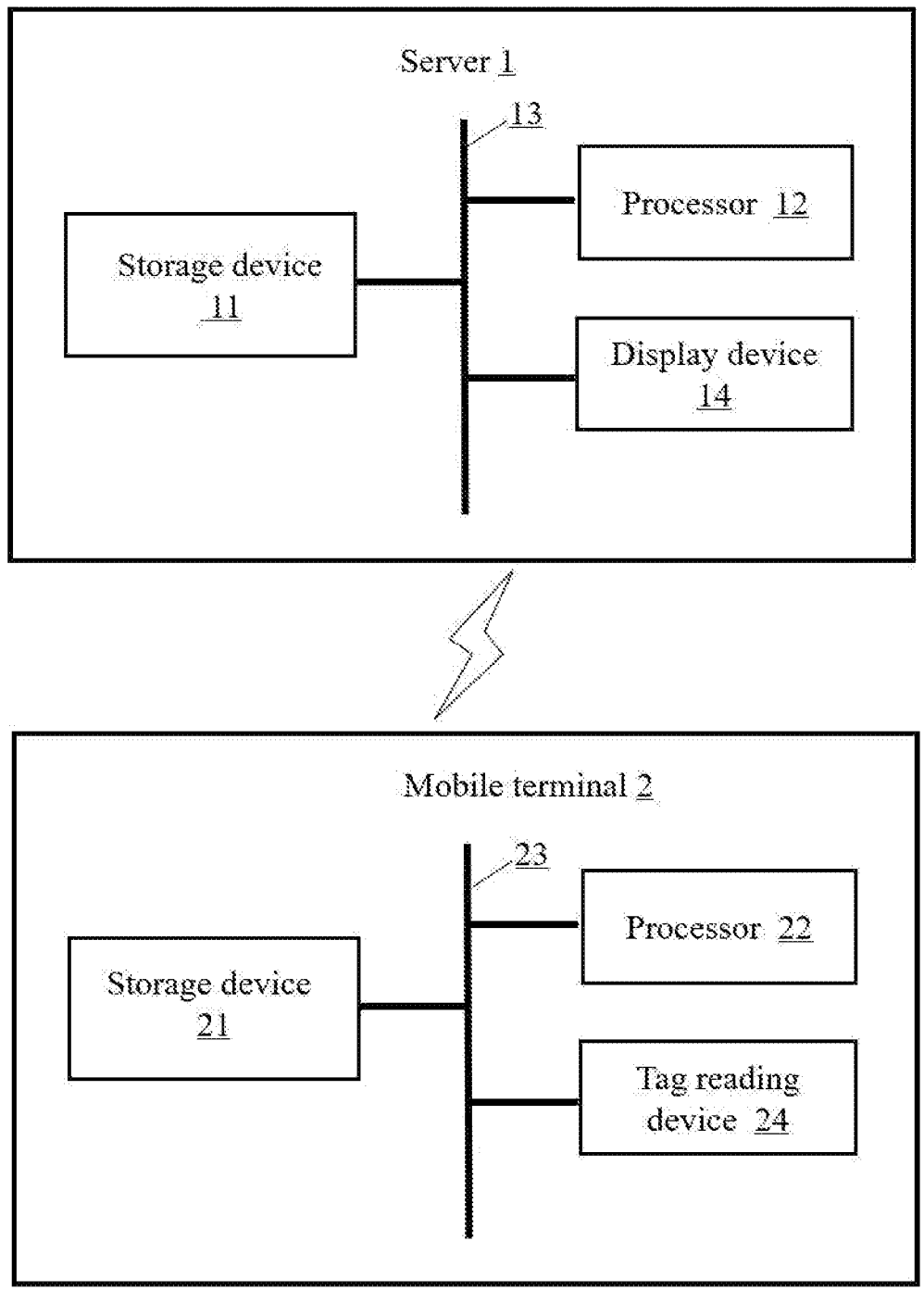
FIG. 1 illustrates an application environment architecture diagram of a method for checking fixed assets.

FIG. 1 illustrates an application environment architecture diagram of a method for checking fixed assets. The method is applied in an environment including a server and/or one or more terminals. The server 1 is in communication with the mobile terminal 2. The server 1 includes, but is not limited to, a storage device 11, at least one processor 12, at least one communication bus 13, and a display device 14.

It should be noted that FIG. 1 is only an example of the server 1. In other embodiments, the server 1 may also include more or fewer components or have different component configurations. The server 1 is a device capable of automatically performing numerical calculation and/or information processing according to an instruction set or stored in advance, and the hardware includes but is not limited to a microprocessor and an application specific integrated circuit (Application Specific Integrated Circuit, ASIC), Field-Programmable Gate Array (FPGA), Digital Signal Processor (DSP), embedded devices, etc.

In at least one embodiment, the mobile terminal 2 can include, but is not limited to, a storage device 21, at least one processor 22, and a tag reading device 24. The tag reading device 24 can read an identification tag disposed on fixed assets. The identification tag can include information of the fixed assets. For example, an asset number, an asset name, a specification, a model, a supplier, a purchase date, and so on can be included. The identification tag may be a radio frequency identification (RFID) tag or a two-dimensional code tag. The tag reading device 24 can read the information of the fixed assets from the identification tag. For example, if the identification tag is a RFID tag, the tag reading device 24 may be a RFID tag reading device. If the identification tag is a two-dimensional code tag, the tag reading device 24 may be an image reader. For example, a linear scan camera. In at least one embodiment, the identification tag is a passive RFID tag, and the passive RFID tag has a metal-resistant magnetic separator, and the cost is low. The passive RFID tag can realize short-range communication (e.g., 1 cm).

In at least one embodiment, the mobile terminal 2 can perform a task of checking fixed assets. The mobile terminal 2 may be, but is not limited to, an industrial security mobile phone, a smart phone, a notebook, a palmtop computer, a tablet computer, a personal digital assistant, or the like. The mobile terminal 2 can perform human-computer interaction with a user through a keyboard, a mouse, a remote controller, a touch panel, or a voice control device.

Figure 2:
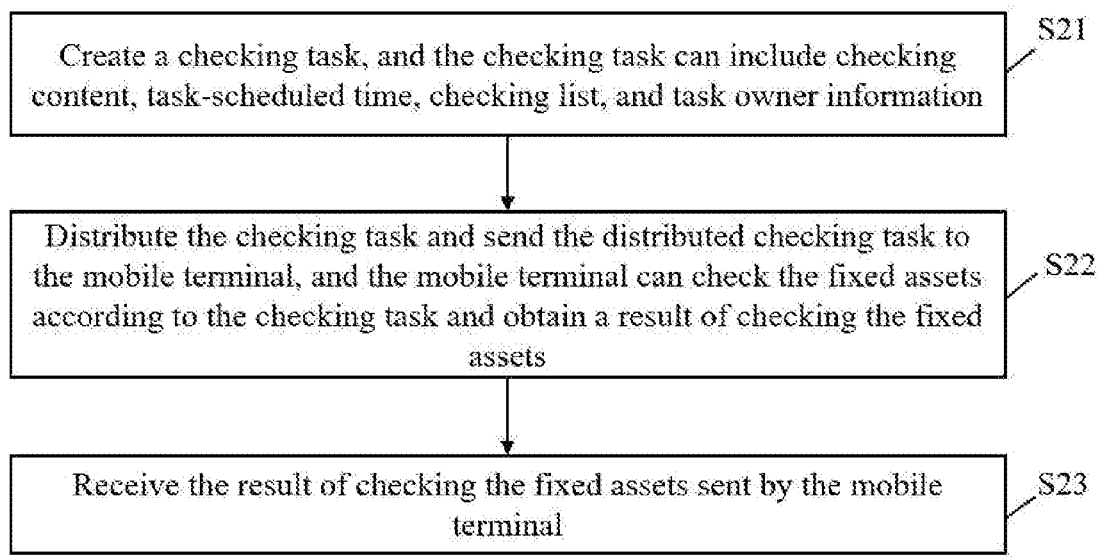
FIG. 2 illustrates a flowchart of one embodiment of a method for checking fixed assets.

FIG. 2 illustrates a flowchart of one embodiment of a method for checking fixed assets of the present disclosure. The method is applied to a server. For a server that needs to perform fixed assets checking function, the function for checking fixed assets provided by the method of the present invention can be directly integrated on the server, or run on the server in the form of a software development kit (SDK).

Referring to FIG. 2, the method is provided by way of example, as there are a variety of ways to carry out the method. Each block shown in FIG. 2 represents one or more processes, methods, or subroutines, carried out in the method. Furthermore, the illustrated order of blocks is illustrative only and the order of the blocks can be changed. Additional blocks can be added or fewer blocks can be utilized without departing from this disclosure. The example method can begin at block S21.

At block S21, the server can create a checking task, and the checking task can include checking content, task-scheduled time period, checking list, and task owner information.

In at least one embodiment, the server can import all fixed assets information that needs to be checked from an enterprise fixed assets management system. The user can make a schedule and checking list for each stage of a process for checking fixed assets of an enterprise, and import the schedule and checking list to the server. The server can create the checking task according to a preset rule based on the schedule, the checking list, and the imported fixed assets information. The fixed assets information also corresponds to task owner information (such as asset custodian) and asset location information (such as the floor where the asset is located).

For example, a task-scheduled time period from 9:00 to 10:00 of the schedule is to check host computer information, and a task-scheduled time period from 10:00 to 11:00 of the schedule is to check display of the computer, and a task-scheduled time period from 11:00 to 12:00 of the schedule is to check keyboard of the computer, and a task-scheduled time period from 13:00 to 14:00 of the schedule is to check cabinet of the enterprise, and a task-scheduled time period from 14:00 to 15:00 of the schedule is to check materials of warehouse of the enterprise, and so on. The checking list can include information such as serial number, asset name, quantity, unit, location, and the like.

At block S22, the server can distribute the checking task and send the distributed checking task to the mobile terminal, and the mobile terminal can check the fixed assets according to the checking task and obtain a result of checking the fixed assets.

In at least one embodiment, the server can divide the checking task into several subtasks, and send the subtasks to several mobile terminals corresponding to several custodians according to prestored custodian information. That is, the server can send the several respective subtasks to several mobile terminals. It should be noted that the server may import fixed assets basic data from a fixed assets management system. The fixed assets basic data can include a table of correspondence between fixed assets and custodians. For example, when the fixed assets are computers, the corresponding custodian is Zhang San, and the fixed assets and the custodian correspondence table stores the name, work number and the like of Zhang San.

In at least one embodiment, the mobile terminal 2 can include the tag reading device 24 and an asset checking application. The asset checking application can receive the checking task from the server. The tag reading device 24 can obtain fixed assets information by reading the identification tag of the fixed assets, and generate the result of checking the fixed assets by filling in the fixed assets information in the checking list.

In at least one embodiment, the mobile terminal can synchronize the checking task to the mobile terminal local after receiving the checking task. Thereby, the mobile terminal 2 can conveniently complete the asset checking process in an offline state.

In at least one embodiment, the mobile terminal can determine whether the result of checking the fixed assets is normal. The mobile terminal can send the result of checking the fixed assets to the server if the result of checking the fixed assets is normal. The mobile terminal can classify the fixed assets and send the classified fixed assets to the server if an abnormality in the result of checking the fixed assets.

In at least one embodiment, the mobile terminal can determine whether the result of checking the fixed assets is normal by comparing a quantity of the fixed assets in the warehouse and a quantity of the fixed assets of the result. For example, if the quantity of the fixed assets in the warehouse is less than the quantity of the assets of the result, the mobile terminal can determine an abnormality in the result. If the quantity of the fixed assets in the warehouse is equal to the quantity of the fixed assets of the result, the mobile terminal can determine the result of checking the fixed assets is normal. If the quantity of the fixed assets in the warehouse is more than the quantity of the fixed assets of the result, the mobile terminal can determine whether the result is normal according to an actual situation.

In at least one embodiment, the mobile terminal can upload the result of checking the fixed assets and the classified fixed assets to the server in batches, or can upload the result of checking the fixed assets and the classified fixed assets to the server in a centralized manner.

In at least one embodiment, the mobile terminal further can determine whether the checking task is completed within the task-scheduled time period. The mobile terminal can pause uploading the result of checking the fixed assets to the server and execute a task-overdue sub-process when the checking task is not completed within the task-scheduled time period. The mobile terminal can execute the task-overdue sub-process for uploading the result of checking the fixed assets to the server under preset conditions. The preset conditions can include unlocking a function of uploading the result of checking the fixed assets to the server after being audited by an authorized user (for example, a department head). In at least one embodiment, a method of determining whether the checking task is completed within the task-scheduled time period include: recording a first current time when the mobile terminal uploading the result of checking the fixed assets to the server; determining whether the first current time is within the task-scheduled time period; determining that the checking task is completed if the first current time is within the task-scheduled time period; determining that the checking task is not completed if the first current time is out of the task-scheduled time period.

In at least one embodiment, another method of determining whether the checking task is completed within the task-scheduled time period include: recording a second current time when the mobile terminal is checking the plurality of fixed assets; determining whether the second current time is within the task-scheduled time period; determining that the checking task is completed if the second current time is within the task-scheduled time period; and determining that the checking task is not completed if the second current time is out of the task-scheduled time period.

In at least one embodiment, the mobile terminal can determine whether the checking task is completed within the task-scheduled time period according to a task-scheduled time period of the checking task and current recorded time. For example, the task-scheduled time period from 9:00 to 10:00 of the schedule is to check host computer information. The mobile terminal is recording the host computer information when the current time is 10:05, the mobile terminal can determine that the checking task is not completed within the task-scheduled time period.

At block S23, the server can receive the result of checking the fixed assets upload by the mobile terminal. Since several mobile terminals can check the fixed assets, each mobile terminal can obtain a result of checking the fixed assets. The server may receive a plurality of results of checking the fixed assets upload by the mobile terminals, and organize the plurality of results of checking the fixed assets into a final result.

In at least one embodiment, the server can check a progress of the checking task based on the received result of checking the fixed assets. The server can divide the checking task into several subtasks. For example, a first subtask, a second subtask, and a third subtask. The server can distribute the first subtask to the mobile terminal A, the second subtask to the mobile terminal B, and the third subtask to the mobile terminal C. Then, the mobile terminal A can obtain a first result of checking the fixed assets by executing the first subtask. The mobile terminal B can obtain a second result of checking the fixed assets by executing the second subtask. The mobile terminal C can obtain a third result of checking the fixed assets by executing the third subtask. The server can check a progress of the checking task based on the received result of checking the fixed assets. For example, when the server only receives the first result of checking the fixed assets, the progress of the checking task is completed by one-third.

Figure 3:
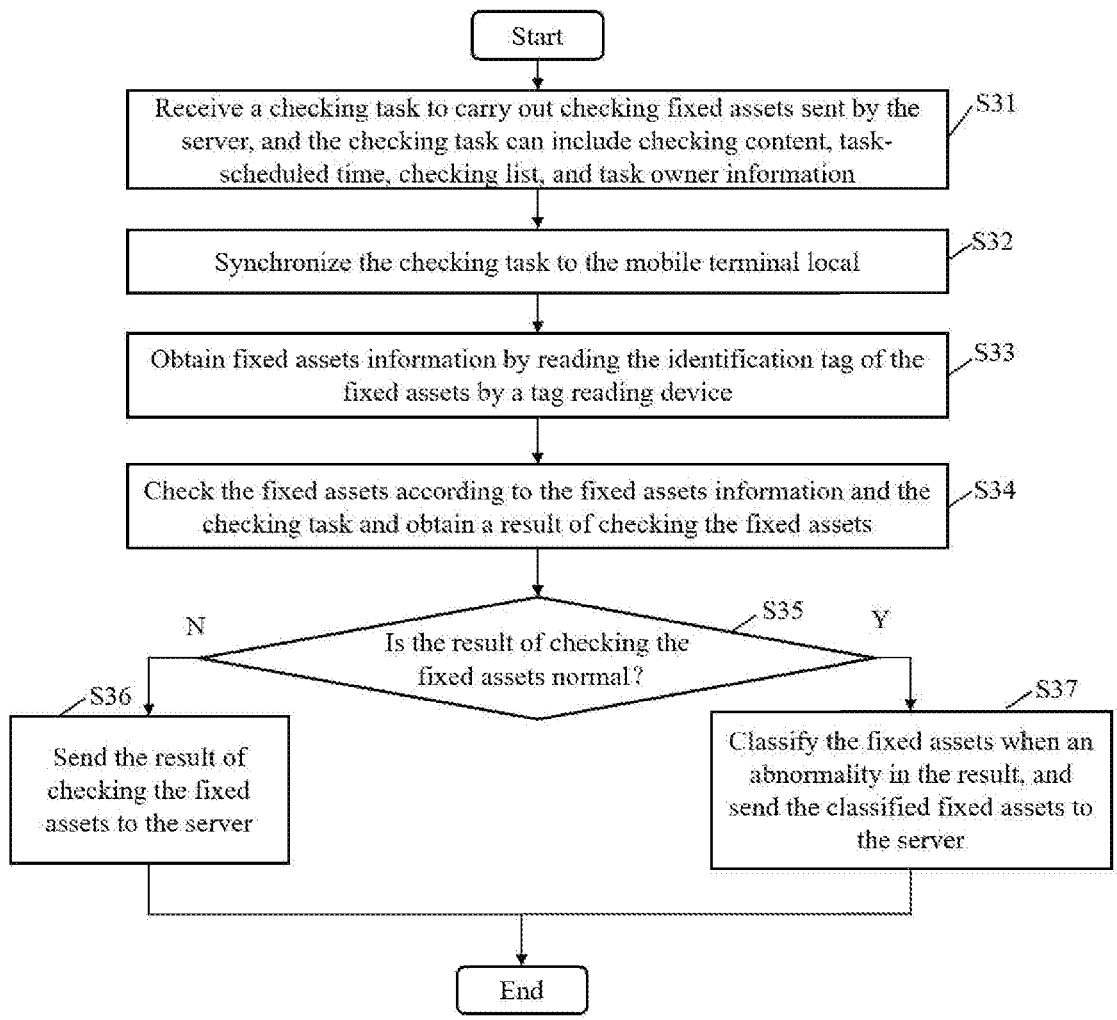
FIG. 3 illustrates a flowchart of another embodiment of a method for checking fixed assets.

FIG. 3 illustrates a flowchart of another embodiment of a method for checking fixed assets. The method is applied to a mobile terminal. For mobile terminals that need to perform a fixed asset checking function, the function for checking fixed assets provided by the method of the present invention can be directly integrated on the mobile terminals, or run on the mobile terminals in the form of a software development kit (SDK).

Referring to FIG. 3, the method is provided by way of example, as there are a variety of ways to carry out the method. Each block shown in FIG. 3 represents one or more processes, methods, or subroutines, carried out in the method. Furthermore, the illustrated order of blocks is illustrative only and the order of the blocks can be changed. Additional blocks can be added or fewer blocks can be utilized without departing from this disclosure. The example method can begin at block S31.

At block S31, the mobile terminal can receive a checking task to carry out checking fixed assets sent by the server, and the checking task can include checking content, task-scheduled time period, checking list, and task owner information.

In at least one embodiment, the server can import all fixed assets information that is needed from the enterprise fixed assets management system. The user can make a schedule and checking list for each stage of a process for checking fixed assets of an enterprise, and import the schedule and checking list to the server. The server can create the checking task according to a preset rule based on the schedule, the checking list, and the imported fixed assets information. The fixed assets information also corresponds to task owner information (such as asset custodian) and asset location information (such as the floor where the asset is located). The location information can include a building, a floor and a location of the floor where the fixed assets is located. For example, each floor of the building may be divided into a plurality of grid areas, each grid area including a number (such as a 2nd floor grid area 3). The location of the floor may be the number of the grid area. Since the existing positioning technology (such as GPS) is not suitable for indoor use, the numbering information of the grid area where the fixed assets are located can be obtained by dividing the floor area of the floor. It can accurately record the location information of fixed assets in the factory.

For example, a task-scheduled time period from 9:00 to 10:00 of the schedule is to check host computer information, and a task-scheduled time period from 10:00 to 11:00 of the schedule is to check display of the computer, and a task-scheduled time period from 11:00 to 12:00 of the schedule is to check keyboard of the computer, and a task-scheduled time period from 13:00 to 14:00 of the schedule is to check cabinet of the enterprise, and a task-scheduled time period from 14:00 to 15:00 of the schedule is to check materials of warehouse of the enterprise, and so on. The checking list can include information such as serial number, asset name, quantity, unit, location, and the like.

In at least one embodiment, the server can distribute the checking task and send the distributed checking task to the mobile terminal. Since there are several mobile terminals, the server can divide the checking task into several respective subtasks, and send the subtasks to the respective mobile terminals.

In at least one embodiment, the mobile terminal may be one, the server can send the checking task to the mobile terminal, and the mobile terminal can perform checking fixed assets based on the checking task.

In at least one embodiment, the method further can include a log-in procedure in the asset checking application of the mobile terminal before receiving the checking task. The mobile terminal can install the asset checking application. The asset checking application can check the fixed assets of the enterprise. For example, computers, printers, materials and so on. When a user logs in in to the asset checking application, the mobile terminal can determine whether the user is an authorized user. For example, the mobile terminal can receive an account and a password inputted by the user and determine whether the user is an authorized user by determining whether the inputted account and password exist in pre-stored accounts and passwords. If the inputted account and password exists in the pre-stored accounts and passwords, the mobile terminal can determine that the user is an authorized user. If the inputted account and password does not exist in the pre-stored accounts and passwords, the mobile terminal can determine that the user is not an authorized user.

At block S32, the mobile terminal can synchronize the checking task to the mobile terminal. Thereby, the mobile terminal 2 can conveniently complete the asset checking process in an offline state.

At block S33, the mobile terminal can obtain fixed assets information by reading the identification tag of the fixed assets by a tag reading device 24.

In at least one embodiment, the mobile terminal can include a tag reading device 24. The tag reading device can read the identification tag of the fixed assets. The identification tag can record fixed assets information. The fixed assets information can include an asset number, name of the fixed assets, a specification of the fixed assets, a model of the fixed assets, a supplier of the fixed assets, a purchase date of the fixed assets, a keeper of the fixed assets, a location of the fixed assets, and so on. The identification tag may be a radio frequency identification (RFID) tag or a two-dimensional code tag. The tag reading device 24 can read the information of the fixed assets from the identification tag. For example, if the identification tag is a RFID tag, the tag reading device 24 may be a RFID tag reading device. If the identification tag is a two-dimensional code tag, the tag reading device 24 may be an image reader. For example, a linear scan camera.

At block S34, the mobile terminal can check the fixed assets according to the fixed assets information and the checking task and obtain a result of checking the fixed assets.

In at least one embodiment, the mobile terminal can check the fixed assets according to the fixed assets information and the checking task and generate the result of checking the fixed assets by filling in the fixed assets information in the checking list. For example, the checking list can include serial number of the fixed assets, name of the fixed assets, quantity of the fixed assets, unit of the fixed assets, and location of the fixed assets.

At block S35, the mobile terminal can determine whether the result of checking the fixed assets is normal. If the result of checking the fixed assets is normal, the process goes to block S36. If an abnormality in the result of checking the fixed assets, the process goes to block S37.

In at least one embodiment, the mobile terminal can determine whether the result of checking the fixed assets is normal by comparing the result of checking the fixed assets with prestored fixed assets information. The prestored fixed assets information can include types of the fixed assets, names of the fixed assets, quantities of the fixed assets, and locations of the fixed assets. The mobile terminal can determine that the result of checking the fixed assets is normal if types of the fixed assets of the result of checking the fixed assets are the same as the types of the fixed assets of the prestored fixed assets information. The mobile terminal can determine that the result of checking the fixed assets is normal if names of the fixed assets of the result of checking the fixed assets are the same as the names of the fixed assets of the prestored fixed assets information. The mobile terminal can determine that the result of checking the fixed assets is normal if quantities of the fixed assets of the result of checking the fixed assets are equal to the quantities of the fixed assets of the prestored fixed assets information. The mobile terminal can determine that the result of checking the fixed assets is normal if locations of the fixed assets of the result of checking the fixed assets are the same as the locations of the fixed assets of the prestored fixed assets information.

For example, the mobile terminal can determine whether the result of checking the fixed assets is normal by comparing a quantity of a material A in the warehouse and a quantity of the same material of the result of checking the fixed assets. For example, if the quantity of the material A in the warehouse is less than the quantity of the material A of the result of checking the fixed assets, the mobile terminal can determine that an abnormality in result of checking the fixed assets. If the quantity of the material A in the warehouse is equal to the quantity of the material A of the result of checking the fixed assets, the mobile terminal can determine that the result of checking the fixed assets is normal. If the quantity of the material A in the warehouse is more than the quantity of the material A of the result of checking the fixed assets, the mobile terminal can determine whether the result of checking the fixed assets is normal according to an actual situation. For example, the material A in the warehouse can include sample material temporarily taken away.

For example, the mobile terminal can determine whether the result of checking the fixed assets is normal by comparing the location of the fixed assets and the location of the prestored fixed assets information. If the location of the fixed assets is different from the location of the prestored fixed assets information, the mobile terminal can determine that an abnormality in the result. If the location of the fixed assets is the same as the location of the prestored fixed assets information, the mobile terminal can determine that the result of checking the fixed assets is normal.

At block S36, the mobile terminal can upload the result of checking the fixed assets to the server.

In at least one embodiment, the mobile terminal can upload the result of checking the fixed assets and the classified result of checking the fixed assets to the server in batches, or can upload the result of checking the fixed assets and the classified result of checking the fixed assets to the server in a centralized manner.

In at least one embodiment, when several mobile terminals are executing fixed assets checking, each mobile terminal can generate a result of checking the fixed assets. The several mobile terminals may aggregate the results of checking the fixed assets and send the results to the server. For example, the several mobile terminals can include a mobile terminal A, a mobile terminal B, and a mobile terminal C. The mobile terminal A can generate a first result of checking the fixed assets, the mobile terminal B can generate a second result of checking the fixed assets, and the mobile terminal C can generate a third result of checking the fixed assets. The mobile terminal B can send the second result of checking the fixed assets to the mobile terminal A, and the mobile terminal C can send the third result of checking the fixed assets to the mobile terminal A. The mobile terminal A can obtain a fourth result of checking the fixed assets by organizing the first result of checking the fixed assets, the second result of checking the fixed assets, and the third result of checking the fixed assets. Then, the mobile terminal A can upload the fourth result of checking the fixed assets to the server.

At block S37, the mobile terminal can classify the fixed assets when the result is determined to be abnormal, and send information of the classified fixed assets to the server.

In at least one embodiment, an abnormality in result of checking the fixed assets can include losing fixed assets, damaged fixed assets, and changed location of the fixed assets and so on. For example, if the quantity of the material A in the warehouse is less than the quantity of the material A of the result of checking the fixed assets, the mobile terminal can determine that an abnormality in the result of checking the fixed assets. The abnormal result of checking the fixed assets may be loss of fixed assets.

In at least one embodiment, the mobile terminal can upload the result of checking the fixed assets and information of the classified fixed assets to the server in batches, or can upload the result of checking the fixed assets and the information of the classified fixed assets to the server in a centralized manner. In at least one embodiment, the information of the classified fixed assets can include abnormality of the classified fixed assets.

In at least one embodiment, the mobile terminal further can determine whether the checking task is completed within the task-scheduled time period of the schedule. The mobile terminal can pause uploading the result of checking the fixed assets to the server and execute a task-overdue sub-process when the checking task is not completed within the task-scheduled time period. The mobile terminal can display a prompt message when the checking task is completed within the task-scheduled time period. For example, the mobile terminal can display "upload success".

In at least one embodiment, the mobile terminal can record current time when the mobile terminal uploads the result of checking the fixed assets to the server. The mobile terminal can determine whether the checking task is completed within the task-scheduled time period by comparing the recorded current time with the task-scheduled time period. If the recorded current time is within the task-scheduled time period, the mobile terminal can determine that the checking task is completed within the task-scheduled time period. If the recorded current time is out of the task-scheduled time period, the mobile terminal can determine that the checking task is not completed within the task-scheduled time period. For example, the task-scheduled time period from 9:00 to 10:00 of the schedule is to check host computer information. The mobile terminal uploads the checking task of the host computer at 10:15, and the recorded current time is 10:15. As the current recorded time is beyond the task-scheduled time period, the mobile terminal can determine that the checking task is not completed within the task-scheduled time period.

In at least one embodiment, the mobile terminal can determine whether the checking task is completed within the task-scheduled time period according to a task-scheduled time period of the checking task and recording current time. The mobile terminal can record the current time when the mobile terminal is checking the fixed assets, and compare the recorded current time and the task-scheduled time period of the checking task to determine whether the checking task is completed within the task-scheduled time period. If the recorded current time within the task-scheduled time period, the mobile terminal can determine that the checking task is completed within the task-scheduled time period. If the recorded current time is after the task-scheduled time period, the mobile terminal can determine that the checking task is not completed within the task-scheduled time period. For example, the task-scheduled time period from 9:00 to 10:00 of the schedule is to check host computer information. When the mobile terminal is recording the host computer information when the current time is 10:05, the mobile terminal can determine that the checking task is not completed within the task-scheduled time period.

In at least one embodiment, the mobile terminal can pause uploading the result of checking the fixed assets to the server and execute a task-overdue sub-process when the checking task is not completed within the task-scheduled time period.

In at least one embodiment, the fixed assets checking method described in the embodiment acquires asset information through a tag reading device installed in the mobile terminal, and obtains a result of checking the fixed assets according to the asset information. The method can fully utilize the asset checking application in the mobile terminal and the internet of things (IoT), and significantly improve the efficiency and accuracy of the enterprise asset checking. The method can be docked or independently deployed with the enterprise asset management system, and is suitable for checking operations in the complex network environment and the operation processes of the enterprise.

Figure 4:
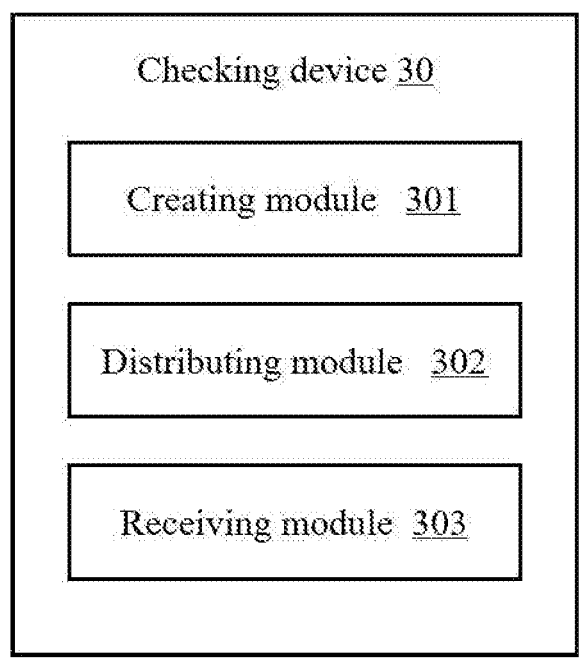
FIG. 4 shows an embodiment of modules of a checking device of fixed assets of the present disclosure.

FIG. 4 shows an embodiment of modules of fixed assets checking device of the present disclosure.

In at least one embodiment, the fixed assets checking device 30 can apply in a server. The server is in communication with several mobile terminals. The fixed assets checking device 30 can include a plurality of functional modules consisting of program code segments. The program code of each program segment in the fixed assets checking device 30 may be stored in a storage device of the server and executed by the at least one processor to perform the checking function of the fixed assets (described in detail in FIG. 2).

In at least one embodiment, the fixed assets checking device 30 can include a plurality of modules. The plurality of modules can include, but is not limited to, a creating module 301, a distributing module 302, and a receiving module 303. The modules 301-303 can comprise computerized instructions in the form of one or more computer-readable programs that can be stored in the non-transitory computer-readable medium (e.g., the storage device of the server), and executed by the at least one processor of the server to implement the functions (e.g., described in detail in FIG. 2).

The creating module 301 can a create a checking task, and the checking task can include checking content, task-scheduled time period, checking list, and task owner information.

In at least one embodiment, the server can import all fixed assets information that is needed from the enterprise fixed assets management system. The user can make a schedule and checking list for each stage of a process for checking fixed assets of an enterprise, and import the schedule and checking list to the server. The server can create the checking task according to a preset rule based on the schedule, the checking list, and the imported fixed assets information. The fixed assets information also corresponds to task owner information (such as asset custodian) and asset location information (such as the floor where the asset is located).

The distributing module 302 can distribute the checking task and send the distributed checking task to the mobile terminal, and the mobile terminal can check the fixed assets according to the checking task and obtain a result of checking the fixed assets.

In at least one embodiment, the server can divide the checking task into several subtasks, and send the several subtasks to several mobile terminals corresponding to several custodians, according to prestored custodian information. That is, the server can send each subtask to one mobile terminal. It should be noted that the server may import fixed assets basic data from a fixed assets management system. The fixed assets basic data can include a table of correspondence between fixed assets and custodians. For example, when the fixed assets are computers, the corresponding custodian is Zhang San, and the fixed assets and the custodian correspondence table stores the name, work number, and the like of Zhang San.

In at least one embodiment, the mobile terminal 2 can include the tag reading device 24 and an asset checking application. The asset checking application can receive the checking task from the server. The tag reading device 24 can obtain fixed assets information by reading the identification tag of the fixed assets, and generate the result of checking the fixed assets by filling in the fixed assets information in the checking list.

In at least one embodiment, the mobile terminal can synchronize the checking task to the mobile terminal local after receiving the checking task. Thereby, the mobile terminal 2 can conveniently complete the asset checking process in an offline state.

In at least one embodiment, the mobile terminal can determine whether the result of checking the fixed assets is normal. The mobile terminal can send the result of checking the fixed assets to the server if the result of checking the fixed assets is normal. The mobile terminal can classify the result of checking the fixed assets and send the classified result of checking the fixed assets to the server if there is an abnormality in the result.

In at least one embodiment, the mobile terminal can determine whether the result of checking the fixed assets is normal by comparing a quantity of the assets in the warehouse and a quantity of the assets of the result of checking the fixed assets. For example, if the quantity of the assets in the warehouse is less than the quantity of the assets of the result of checking the fixed assets, the mobile terminal can determine that an abnormality in the result. If the quantity of the assets in the warehouse is equal to the quantity of the assets of the result of checking the fixed assets, the mobile terminal can determine that the result of checking the fixed assets is normal. If the quantity of the assets in the warehouse is more than the quantity of the assets of the result of checking the fixed assets, the mobile terminal can determine whether the result of checking the fixed assets is normal according to an actual situation.

In at least one embodiment, the mobile terminal can upload the result of checking the fixed assets and the classified result of checking the fixed assets to the server in batches, or can upload the result of checking the fixed assets and the classified result of checking the fixed assets to the server in one transmission.

In at least one embodiment, the mobile terminal further can determine whether the checking task is completed within the task-scheduled time period of the schedule. The mobile terminal can pause uploading the result of checking the fixed assets to the server and execute a task-overdue sub-process when the checking task is not completed within the task-scheduled time period. The mobile terminal can execute the overdue sub-process for uploading the result of checking the fixed assets to the server under preset conditions. The preset conditions can include unlocking the function of uploading the result of checking the fixed assets to the server after being audited by an authorized user (for example, a department head). In at least one embodiment, the mobile terminal can determine whether the checking task is completed within the task-scheduled time period according to a task-scheduled time period of the checking task and current recorded time. For example, the task-scheduled time period from 9:00 to 10:00 of the schedule is to check host computer information. The mobile terminal is recording the host computer information when the current time is 10:05, the mobile terminal can determine that the checking task is not completed within the task-scheduled time period.

The receiving module 303 can receive the result of checking the fixed assets sent by the mobile terminal. Since several mobile terminals can check the fixed assets, each mobile terminal can obtain a result of checking the fixed assets. The server may receive a plurality of result of checking the fixed assets sent by the mobile terminals, and organize the plurality of result of checking the fixed assets into a final result of checking the fixed assets.

In at least one embodiment, the server can check a progress of the checking task based on the received result of checking the fixed assets. The server can divide the checking task into several subtasks. For example, a first subtask, a second subtask, and a third subtask. The server can distribute the first subtask to the mobile terminal A, the server can distribute the second subtask to the mobile terminal B, and the server can distribute the third subtask to the mobile terminal C. Then, the mobile terminal A can obtain a first result of checking the fixed assets by executing the first subtask. The mobile terminal B can obtain a second result of checking the fixed assets by executing the second subtask.

The mobile terminal C can obtain a third result of checking the fixed assets by executing the third subtask. The server can check a progress of the checking task based on the received result of checking the fixed assets. For example, when the server only receives the first result of checking the fixed assets, the progress of the checking task is completed by one-third.

Figure 5:
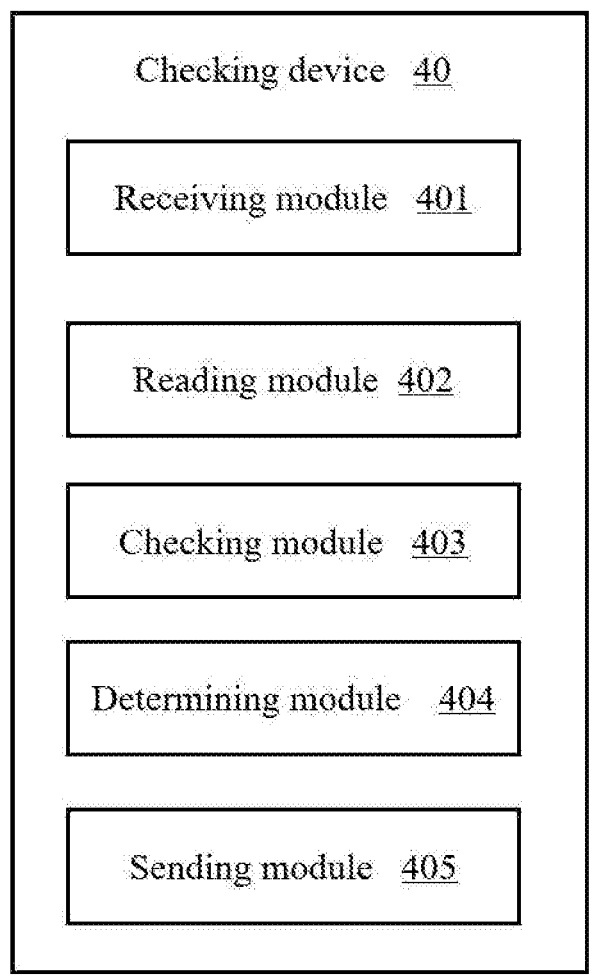
FIG. 5 shows another embodiment of modules of a checking device of fixed assets.

FIG. 5 shows another embodiment of modules of a checking device of fixed assets of the present disclosure.

In at least one embodiment, the checking device 40 can apply in a mobile terminal. There may be multiple mobile terminals, and the mobile terminals are in communication with a server. The checking device 40 can include a plurality of functional modules consisting of program code segments. The program code of each program segment in the checking device 40 may be stored in a storage device of the server and executed by the at least one processor to perform the checking function of the fixed assets (described in detail in FIG. 3).

In at least one embodiment, the checking device 40 can include a plurality of modules. The plurality of modules can include, but is not limited to, a receiving module 401, a reading module 402, a checking module 403, a determining module 404, and a sending module 405. The modules 401-405 can comprise computerized instructions in the form of one or more computer-readable programs that can be stored in the non-transitory computer-readable medium (e.g., the storage device of the mobile terminal), and executed by the at least one processor of the server to implement the functions (e.g., described in detail in FIG. 3).

The receiving module 401 can receive a checking task sent by the server, and the checking task can include checking content, task-scheduled time period, checking list, and task owner information.

In at least one embodiment, the server can import all fixed assets information that is needed from the enterprise fixed assets management system. The user can make a schedule and checking list for each stage of a process for checking fixed assets of an enterprise, and import the schedule and checking list to the server. The server can create the checking task according to a preset rule based on the schedule, the checking list, and the imported fixed assets information. The fixed assets information also corresponds to task owner information (such as asset custodian) and asset location information (such as the floor where the asset is located).

In at least one embodiment, the server can distribute the checking task and send the distributed checking task to the mobile terminal. Since there are several mobile terminals, the server can divide the checking task into subtasks, and distribute the subtasks among the several mobile terminals.

In at least one embodiment, the mobile terminal may be only one, the server can send the checking task to the mobile terminal, and the mobile terminal can perform checking fixed assets based on the checking task.

In at least one embodiment, checking device 40 further can include a log-in procedure in the asset checking application of the mobile terminal before receiving the checking task. The mobile terminal can install the asset checking application. The asset checking application can check the fixed assets of the enterprise. For example, computers, printers, materials and so on. When a user logs in to the asset checking application, the mobile terminal can determine whether the user is an authorized user. For example, the mobile terminal can receive an account and a password inputted by the user and determine whether the user is an authorized user by determining whether the inputted account and password exist in pre-stored accounts and passwords. If the inputted account and password exist in the pre-stored accounts and passwords, the mobile terminal can determine that the user is an authorized user. If the inputted account and password do not exist in the pre-stored accounts and passwords, the mobile terminal can determine that the user is not an authorized user.

The receiving module 401 can further synchronize the checking task to the mobile terminal. Thereby, the mobile terminal 2 can conveniently complete the asset checking process in an offline state.

The reading module 402 can obtain fixed assets information by reading an identification tag of each of a plurality of fixed assets by a tag reading device 24 of the mobile terminal.

In at least one embodiment, the mobile terminal can include a tag reading device 24. The tag reading device can read the identification tag of the fixed assets. The identification tag can record fixed assets information. The fixed assets information can include an asset number, an asset name, a specification, a model, a supplier, a purchase date, a location, and so on. The identification tag may be a radio frequency identification (RFID) tag or a two-dimensional code tag. The tag reading device 24 can read the information of the fixed assets from the identification tag. For example, if the identification tag is an RFID tag, the tag reading device 24 may be an RFID tag reading device. If the identification tag is a two-dimensional code tag, the tag reading device 24 may be an image reader. For example, a linear scan camera.

The checking module 403 can check the plurality of fixed assets according to the fixed assets information and the checking task and obtain a result of checking the fixed assets.

In at least one embodiment, the mobile terminal can generate the result of checking the fixed assets by filling in the fixed assets information in the checking list. For example, the checking list can include serial number of the fixed assets, name of the fixed assets, quantity of the fixed assets, unit of the fixed assets, and location of the fixed assets.

The determining module 404 can determine whether the result of checking the fixed assets is normal.

In at least one embodiment, the mobile terminal can determine whether the result of checking the fixed assets is normal by comparing the result of checking the fixed assets and prestored fixed assets information. The prestored fixed assets information can include types of the fixed assets, names of the fixed assets, quantities of the fixed assets, and locations of the fixed assets. For example, the mobile terminal can determine whether the result of checking the fixed assets is normal by comparing a quantity of a material A in the warehouse and a quantity of same material of the result of checking the fixed assets. For example, if the quantity of the material A in the warehouse is less than the quantity of the material A of the result of checking the fixed assets, the mobile terminal can determine that an abnormality in the result. If the quantity of the material A in the warehouse is equal to the quantity of the material A of the result of checking the fixed assets, the mobile terminal can determine that the result of checking the fixed assets is normal. If the quantity of the material A in the warehouse is more than the quantity of the material A of the result of checking the fixed assets, the mobile terminal can determine whether the result of checking the fixed assets is normal according to an actual situation. For example, the material A in the warehouse can include material for samples.

For example, the mobile terminal can determine whether the result of checking the fixed assets is normal by comparing the location of the fixed assets and the location of the prestored fixed assets information. If the location of the fixed assets is different from the location of the prestored fixed assets information, the mobile terminal can determine that an abnormality in the result. If the location of the fixed assets is the same as the location of the prestored fixed assets information, the mobile terminal can determine that the result of checking the fixed assets is normal.

The sending module 405 can upload the result of checking the fixed assets to the server.

In at least one embodiment, the mobile terminal can upload the result of checking the fixed assets and the classified result of checking the fixed assets to the server in batches, or can upload the result of checking the fixed assets and the classified result of checking the fixed assets to the server in one transmission.

In at least one embodiment, when several mobile terminals are executing fixed assets checking, each mobile terminal can generate a result of checking the fixed assets. The several mobile terminals may aggregate the result of checking the fixed assets and send the results to the server.

The sending module 405 can further classify the fixed assets when the result is determined to be abnormal, and send information of the classified fixed assets to the server.

In at least one embodiment, an abnormality in the result can include loss of fixed assets, damaged fixed assets, and changed location of the fixed assets and so on. For example, if the quantity of the material A in the warehouse is less than the quantity of the material A of the result of checking the fixed assets, the mobile terminal can determine that an abnormality in the result. The abnormality in the result may be loss of fixed assets.

In at least one embodiment, the mobile terminal can upload the result of checking the fixed assets and the classified result of checking the fixed assets to the server in batches, or can upload the result of checking the fixed assets and the classified result of checking the fixed assets to the server in one transmission.

In at least one embodiment, the mobile terminal further can determine whether the checking task is completed within the task-scheduled time period of the schedule. The mobile terminal can pause uploading the result of checking the fixed assets to the server and execute a task-overdue sub-process when the checking task is not completed within the task-scheduled time period. The mobile terminal can display a prompt message when the checking task is completed within the task-scheduled time period. For example, the mobile terminal can display "upload success".

In at least one embodiment, the mobile terminal can record the current time when the mobile terminal uploads the result of checking the fixed assets to the server. The mobile terminal can determine whether the checking task is completed within the task-scheduled time period by comparing the recorded current time with the task-scheduled time period. If the recorded current time is within the task-scheduled time period, the mobile terminal can determine that the checking task is completed within the task-scheduled time period. If the recorded time is outside the task-scheduled time period, the mobile terminal can determine that the checking task is not completed within the task-scheduled time period.

In at least one embodiment, the mobile terminal can determine whether the checking task is completed within the task-scheduled time period according to a task-scheduled time period of the checking task and recorded current time. The mobile terminal can record the current time when the mobile terminal is checking the fixed assets, and compare the current recorded time and the task-scheduled time period of the checking task to determine whether the checking task is completed within the task-scheduled time period. If the current recorded time is within the task-scheduled time period, the mobile terminal can determine that the checking task is completed within the task-scheduled time period. If the current recorded time is outside the task-scheduled time period, the mobile terminal can determine that the checking task is not completed within the task-scheduled time period.

In at least one embodiment, the mobile terminal can pause uploading the result of checking the fixed assets to the server and execute a task-overdue sub-process when the checking task is not completed within the task-scheduled time period.

In at least one embodiment, the fixed assets checking method described in the embodiment of the present invention acquires asset information through a tag reading device installed in the mobile terminal, and obtains a result of checking the fixed assets according to the asset information. The method can fully utilize the asset checking application in the mobile terminal and the internet of things (IoT), and significantly improve the efficiency and accuracy of the enterprise asset checking. The method can be docked or independently deployed with the enterprise asset management system, and is suitable for checking operations in the complex network environment and the operation process of the enterprise.

Figure 6:
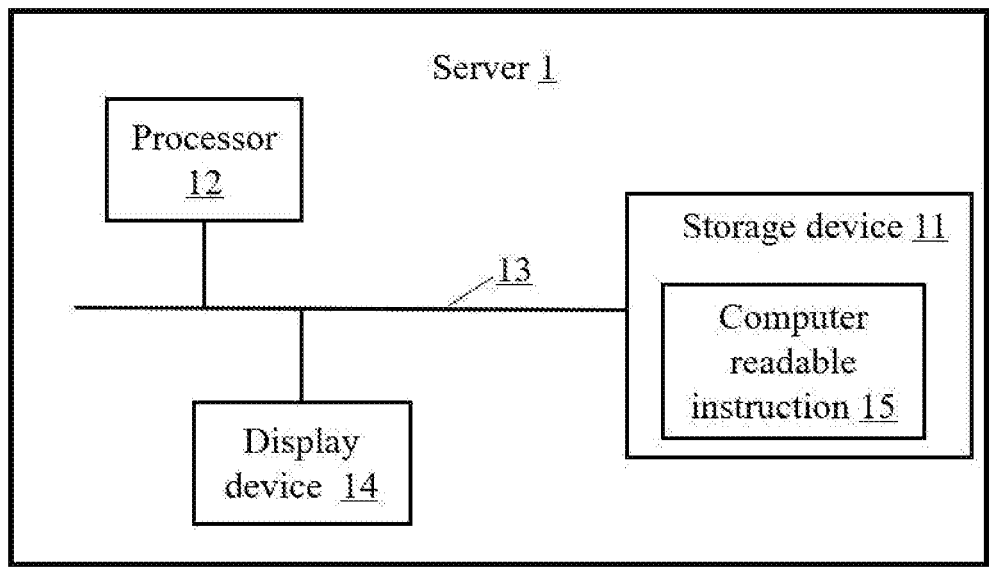
FIG. 6 shows one embodiment of a schematic structural diagram of a server.

FIG. 6 shows one embodiment of a schematic structural diagram of a server. In an embodiment, the server 1 includes a storage device 11, at least one processor 12, at least one communication bus 13, and a display device 14. The server 1 further can include at least one computer readable instruction 15, stored in the storage device 11, and executable on the processor 12. When the processor 12 executes the computer readable instruction 15, the steps in the fixed assets checking method embodiment are implemented, for example, steps S21 to S23 shown in FIG. 2.

In at least one embodiment, the computer readable instruction 15 can be partitioned into one or more modules/units that are stored in the storage device 11 and executed by the processor 12. The one or more modules/units may be a series of computer program instruction segments capable of performing a particular function for describing the execution of the computer readable instruction 15 in the server 1.

In at least one embodiment, the server 1 is a device, the hardware thereof includes but is not limited to a microprocessor and an application specific integrated circuit (ASIC), Field-Programmable Gate Array (FPGA), Digital Signal Processor (DSP), embedded devices, etc. It can be understood by those skilled in the art that the schematic diagram 6 is merely an example of the server 1, it does not constitute a limitation of the server 1, other examples may include more or less components than those illustrated, or combine some components, or different components. For example, the server 1 may further include an input/output device, a network access device, a bus, and the like.

In some embodiments, the at least one processor 12 may be a central processing unit (CPU), and may also include other general-purpose processors, digital signal processors (DSPs), application specific integrated circuits (ASICs), and off-the-shelf programmable gate arrays, Field-Programmable Gate Array (FPGA) or other programmable logic device, discrete gate, or transistor logic device, discrete hardware components, etc. The general-purpose processor may be a microprocessor or the processor may be any conventional processor or the like. The processor 12 is control center of the server 1, and connects sections of the entire server 1 with various interfaces and lines.

In some embodiments, the storage device 11 can be used to store program codes of computer readable programs and various data, such as the fixed assets checking device 30 installed in the server 1. The storage device 11 can include a read-only memory (ROM), a random access memory (RAM), a programmable read-only memory (PROM), an erasable programmable read only memory (EPROM), a one-time programmable read-only memory (OTPROM), an electronically-erasable programmable read-only memory (EEPROM)), a compact disc read-only memory (CD-ROM), or other optical disk storage, magnetic disk storage, magnetic tape storage, or any other storage medium readable by the server 1.

The modules/units integrated by the server 1 can be stored in a computer readable storage medium if implemented in the form of a software functional unit and sold or used as a stand-alone product. The present disclosure implements all or part of the processes in the foregoing embodiments, and a computer program may also instruct related hardware. The computer program may be stored in a computer readable storage medium. The steps of the various method embodiments described above may be implemented by a computer program when executed by a processor. Wherein, the computer program comprises computer program code, which may be in the form of source code, product code form, executable file, or some intermediate form. The computer readable medium may include any entity or device capable of carrying the computer program code, a recording medium, a USB flash drive, a removable hard disk, a magnetic disk, an optical disk, a computer memory, a read-only memory (ROM), random access memory (RAM), electrical carrier signals, telecommunications signals, and software distribution media. It should be noted that the content contained in the computer readable medium may be increased or decreased according to the requirements of legislation and patent practice in a jurisdiction, for example, in some jurisdictions, computer-readable media does not include electrical carrier signals and telecommunication signals.

Figure 7:
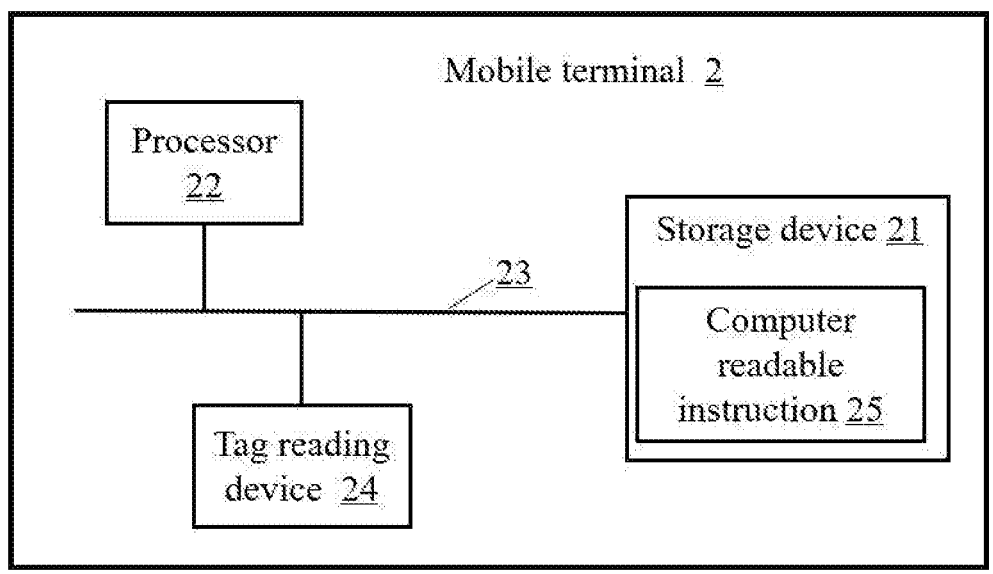
FIG. 7 shows one embodiment of a schematic structural diagram of a mobile terminal.

FIG. 7 shows one embodiment of a schematic structural diagram of a mobile terminal. In an embodiment, the mobile terminal 2 includes a storage device 21, at least one processor 22, at least one communication bus 23, and a tag reading device 24. The mobile terminal 2 further can include at least one computer readable instruction 25, stored in the storage device 21, and executable on the processor 22. When the processor 22 executes the computer readable instruction 25, the steps in the fixed assets checking method embodiment are implemented, for example, steps S31 to S37 shown in FIG. 3.

In at least one embodiment, the computer readable instruction 25 can be partitioned into one or more modules/units that are stored in the storage device 21 and executed by the processor 22. The one or more modules/units may be a series of computer program instruction segments capable of performing a particular function for describing the execution of the computer readable instruction 25 in the mobile terminal 2.

In at least one embodiment, the hardware of the mobile terminal 2 includes but is not limited to a microprocessor and an application specific integrated circuit (ASIC), Field-Programmable Gate Array (FPGA), Digital Signal Processor (DSP), embedded devices, etc. It can be understood by those skilled in the art that the schematic diagram 7 is merely an example of the mobile terminal 2, does not constitute a limitation of the mobile terminal 2, and other examples may include more or less components than those illustrated, or combine some components, or different components. For example, the mobile terminal 2 may further include an input/output device, a network access device, a bus, and the like.

In some embodiments, the at least one processor 22 may be a central processing unit (CPU), and may also include other general-purpose processors, digital signal processors (DSPs), application specific integrated circuits (ASICs), and off-the-shelf programmable gate arrays, Field-Programmable Gate Array (FPGA) or other programmable logic device, discrete gate, or transistor logic device, discrete hardware components, etc. The general-purpose processor may be a microprocessor or the processor may be any conventional processor or the like. The processor 22 is control center of the mobile terminal 2, and connects sections of the entire mobile terminal 2 with various interfaces and lines.

In some embodiments, the storage device 21 can be used to store program codes of computer readable programs and various data, such as the checking device 40 installed in the mobile terminal 2. The storage device 21 can include a read-only memory (ROM), a random access memory (RAM), a programmable read-only memory (PROM), an erasable programmable read only memory (EPROM), a one-time programmable read-only memory (OTPROM), an electronically-erasable programmable read-only memory (EEPROM)), a compact disc read-only memory (CD-ROM), or other optical disk storage, magnetic disk storage, magnetic tape storage, or any other storage medium readable by the mobile terminal 2.

The modules/units integrated by the mobile terminal 2 can be stored in a computer readable storage medium if implemented in the form of a software functional unit and sold or used as a stand-alone product. The present disclosure implements all or part of the processes in the foregoing embodiments, and a computer program may also instruct related hardware. The computer program may be stored in a computer readable storage medium. The steps of the various method embodiments described above may be implemented by a computer program when executed by a processor. Wherein, the computer program comprises computer program code, which may be in the form of source code, product code form, executable file, or some intermediate form. The computer readable medium may include any entity or device capable of carrying the computer program code, a recording medium, a USB flash drive, a removable hard disk, a magnetic disk, an optical disk, a computer memory, a read-only memory (ROM), random access memory (RAM), electrical carrier signals, telecommunications signals, and software distribution media. It should be noted that the content contained in the computer readable medium may be increased or decreased according to the requirements of legislation and patent practice in a jurisdiction, for example, in some jurisdictions, computer-readable media does not include electrical carrier signals and telecommunication signals.

The above description only describes embodiments of the present disclosure, and is not intended to limit the present disclosure, various modifications and changes can be made to the present disclosure. Any modifications, equivalent substitutions, improvements, etc. made within the spirit and scope of the present disclosure are intended to be included within the scope of the present disclosure.

What is claimed is:

1. A fixed assets checking method applicable in a mobile terminal, the mobile terminal is communicating with a server, the method comprising:

receiving a checking task sent by the server, wherein the checking task comprises checking content, task-scheduled time period, checking list, and task owner information;

obtaining fixed assets information by reading an identification tag of each of a plurality of fixed assets by a tag reading device of the mobile terminal;

checking the plurality of fixed assets according to the fixed assets information and the checking task;

obtaining a result of checking the fixed assets;

determining whether the result of checking the fixed assets is normal; and uploading the result of checking the fixed assets to the server when the result of checking the fixed assets is normal.

2. The method according to claim 1, wherein the method further comprising:

classifying the plurality of fixed assets when the result is determined to be abnormal; and sending information of the classified fixed assets to the server.

3. The method according to claim 1, wherein the method further comprising:

determining whether the checking task is completed within the task-scheduled time period;

pausing uploading the result of checking the fixed assets to the server when the checking task is not completed within the task-scheduled time period; and displaying a prompt message when the checking task is completed within the task-scheduled time period.

4. The method according to claim 3, wherein a method of determining whether the checking task is completed within the task-scheduled time period comprising:

recording a first current time when the mobile terminal uploading the result of checking the fixed assets to the server;

determining whether the first current time is within the task-scheduled time period;

determining that the checking task is completed if the first current time is within the task-scheduled time period;

determining that the checking task is not completed if the first current time is out of the task-scheduled time period.

5. The method according to claim 3, wherein a method of determining whether the checking task is completed within the task-scheduled time period comprising:

recording a second current time when the mobile terminal is checking the plurality of fixed assets;

determining whether the second current time is within the task-scheduled time period;

determining that the checking task is completed if the second current time is within the task-scheduled time period;

determining that the checking task is not completed if the second current time is out of the task-scheduled time period.

6. The method according to claim 3, wherein the method further comprising:

synchronizing the checking task to the mobile terminal.

7. The method according to claim 3, wherein a method of determining whether the result of checking the fixed assets is normal comprising:

comparing the result of checking the fixed assets with prestored fixed assets information, wherein the prestored fixed assets information comprises types of the fixed assets, names of the fixed assets, quantities of the fixed assets, and locations of the fixed assets;

determining that the result of checking the fixed assets is normal if types of the fixed assets which have been checked are the same as the types of the fixed assets of the prestored fixed assets information;

determining that the result of checking the fixed assets is normal if names of the fixed assets which have been checked are the same as the names of the fixed assets of the prestored fixed assets information;

determining that the result of checking the fixed assets is normal if quantities of the fixed assets which have been checked are equal to the quantities of the fixed assets of the prestored fixed assets information; and determining that the result of checking the fixed assets is normal if locations of the fixed assets which have been checked are the same as the locations of the fixed assets of the prestored fixed assets information.

8. A mobile terminal communicating with a server, the mobile terminal comprising:

a tag reading device;

a storage device;

at least one processor; and the storage device storing one or more programs that, when executed by the at least one processor, cause the at least one processor to:

receive a checking task sent by the server, wherein the checking task comprises checking content, task-scheduled time period, checking list, and task owner information;

obtain fixed assets information by reading an identification tag of each of a plurality of fixed assets by a tag reading device of the mobile terminal;

check the plurality of fixed assets according to the fixed assets information and the checking task;

obtain a result of checking the fixed assets;

determine whether the result of checking the fixed assets is normal; and upload the result of checking the fixed assets to the server when the result of checking the fixed assets is normal.

9. The mobile terminal according to claim 8, wherein the at least one processor is further caused to:

classify the plurality of fixed assets when the result is determined to be abnormal; and send information of the classified fixed assets to the server.

10. The mobile terminal according to claim 8, wherein the at least one processor is further caused to:

determine whether the checking task is completed within the task-scheduled time period;

pause uploading the result of checking the fixed assets to the server when the checking task is not completed within the task-scheduled time period;

display a prompt message when the checking task is completed within the task-scheduled time period.

11. The mobile terminal according to claim 10, wherein the at least one processor is further caused to:

record a first current time when the mobile terminal uploading the result of checking the fixed assets to the server;

determine whether the first current time is within the task-scheduled time period;

determine that the checking task is completed if the first current time is within the task-scheduled time period;

determine that the checking task is not completed if the first current time is out of the task-scheduled time period.

12. The mobile terminal according to claim 10, wherein the at least one processor is further caused to:

record a second current time when the mobile terminal is checking the plurality of fixed assets;

determine whether the second current time is within the task-scheduled time period;

determine that the checking task is completed if the second current time is within the task-scheduled time period;

determine that the checking task is not completed if the second current time is out of the task-scheduled time period.

13. The mobile terminal according to claim 10, wherein the at least one processor is further caused to:

synchronize the checking task to the mobile terminal.

14. The mobile terminal according to claim 10, wherein the at least one processor is further caused to:

compare the result of checking the fixed assets with prestored fixed assets information, wherein the prestored fixed assets information comprises types of the fixed assets, names of the fixed assets, quantities of the fixed assets, and locations of the fixed assets;

determine that the result of checking the fixed assets is normal if types of the fixed assets which have been checked are the same as the types of the fixed assets of the prestored fixed assets information;

determine that the result of checking the fixed assets is normal if names of the fixed assets which have been checked are the same as the names of the fixed assets of the prestored fixed assets information;

determine that the result of checking the fixed assets is normal if quantities of the fixed assets which have been checked are equal to the quantities of the fixed assets of the prestored fixed assets information; and determine that the result of checking the fixed assets is normal if locations of the fixed assets which have been checked are the same as the locations of the fixed assets of the prestored fixed assets information.

15. The mobile terminal according to claim 8, wherein the tag reading device is cooperated with the identification tag, wherein the identification tag comprises a radio frequency identification (RFID) tag and a two-dimensional code tag.

16. A non-transitory storage medium having stored thereon instructions that, when executed by a processor of a mobile terminal, the mobile terminal is communicating with a server, causes the processor to perform fixed assets checking method, the method comprising:

receiving a checking task sent by the server, wherein the checking task comprises checking content, task-scheduled time period, checking list, and task owner information;

obtaining fixed assets information by reading an identification tag of each of a plurality of fixed assets by a tag reading device of the mobile terminal;

checking the plurality of fixed assets according to the fixed assets information and the checking task;

obtaining a result of checking the fixed assets;

determining whether the result of checking the fixed assets is normal; and uploading the result of checking the fixed assets to the server when the result of checking the fixed assets is normal.

17. The non-transitory storage medium according to claim 16, wherein the method further comprising:

classifying the plurality of fixed assets when the result is determined to be abnormal; and sending information of the classified fixed assets to the server.

18. The non-transitory storage medium according to claim 16, wherein the method further comprising:
- determining whether the checking task is completed within the task-scheduled time period;
- pausing uploading the result of checking the fixed assets to the server when the checking task is not completed within the task-scheduled time period; and
- displaying a prompt message when the checking task is completed within the task-scheduled time period.

19. The non-transitory storage medium according to claim 16, wherein the determining whether the checking task is completed within the task-scheduled time period comprising:
- recording a first current time when the mobile terminal uploading the result of checking the fixed assets to the server;
- determining whether the first current time is within the task-scheduled time period;
- determining that the checking task is completed if the first current time is within the task-scheduled time period;
- determining that the checking task is not completed if the first current time is out of the task-scheduled time period.

20. The non-transitory storage medium according to claim 18, wherein the determining whether the checking task is completed within the task-scheduled time period comprising:
- recording a second current time when the mobile terminal is checking the plurality of fixed assets;
- determining whether the second current time is within the task-scheduled time period;
- determining that the checking task is completed if the second current time is within the task-scheduled time period;
- determining that the checking task is not completed if the second current time is out of the task-scheduled time period.

21. The non-transitory storage medium according to claim 18, wherein the method further comprising:
- synchronizing the checking task to the mobile terminal.

22. The non-transitory storage medium according to claim 18, wherein the determining whether the result of checking the fixed assets is normal comprising:
- comparing the result of checking the fixed assets with prestored fixed assets information, wherein the prestored fixed assets information comprises types of the fixed assets, names of the fixed assets, quantities of the fixed assets, and locations of the fixed assets;
- determining that the result of checking the fixed assets is normal if types of the fixed assets which have been checked are the same as the types of the fixed assets of the prestored fixed assets information;
- determining that the result of checking the fixed assets is normal if names of the fixed assets which have been checked are the same as the names of the fixed assets of the prestored fixed assets information;
- determining that the result of checking the fixed assets is normal if quantities of the fixed assets which have been checked are equal to the quantities of the fixed assets of the prestored fixed assets information; and
- determining that the result of checking the fixed assets is normal if locations of the fixed assets which have been checked are the same as the locations of the fixed assets of the prestored fixed assets information.

* * * * *